United States Patent [19]

Arcella et al.

[11] Patent Number: 5,260,392
[45] Date of Patent: Nov. 9, 1993

[54] IONICALLY VULCANIZABLE FLUOROELASTOMERIC COPOLYMERS

[75] Inventors: Vincenzo Arcella, Novara; Giulio Brinati, Milan; Margherita Albano, Milan; Anna Minutillo, Milan; Graziella Chiodini, Saronno, all of Italy

[73] Assignee: Ausimont S.p.A., Milan, Italy

[21] Appl. No.: 15,264

[22] Filed: Feb. 8, 1993

Related U.S. Application Data

[63] Continuation of Ser. No. 744,772, Aug. 14, 1991, abandoned.

[30] Foreign Application Priority Data

Jul. 24, 1991 [IT] Italy .................. MI91 A 002041

[51] Int. Cl.$^5$ .................................. C08F 16/24
[52] U.S. Cl. ...................... 526/247; 526/249; 526/254; 526/255
[58] Field of Search .............. 526/247, 249, 254, 255

[56] References Cited

U.S. PATENT DOCUMENTS 4,745,165  5/1988  Arcella et al. .................. 526/247

FOREIGN PATENT DOCUMENTS 2347389   4/1977   France ................... 526/247
953152    3/1964   United Kingdom ......... 526/247
1496084   12/1977  United Kingdom ......... 526/247

*Primary Examiner*—Joseph L. Schofer
*Assistant Examiner*—N. Sarofim
*Attorney, Agent, or Firm*—Bryan Cave

[57] ABSTRACT

Fluoroelastomeric copolymers, vulcanizable by ionic methods, suitable for the manufacture of "shaft seals" and "fuel hoses", comprising by weight:

| VDF  | 30–47% |
|------|--------|
| HFP  | 20–40% |
| PAVE | 3–20%  |
| TFE  | 10–30% |

6 Claims, No Drawings

IONICALLY VULCANIZABLE FLUOROELASTOMERIC COPOLYMERS

This is a continuation of U.S. application Ser. No. 07/774,772, filed Aug. 14, 1991, now abandoned, which is incorporated by reference herein.

THE PRIOR ART

The present invention relates to fluoroelastomeric copolymers based on mononeric units deriving from vinylidene fluoride (VDF), which are ionically vulcanizable and are suitable for the production of "shaft seals" and "fuel hoses".

As known, the preparation of such articles requires elastomeric materials exhibiting an optimal combination of the following characteristics: good resistance properties to motor oils and/or gasoline, good resistance properties to high temperatures as well as good low temperature performance, and, in particular, for manufactured articles such as "shaft seals", good mold processability, both in compression molding and injection molding, and finally a good vulcanization rate.

It is known to produce said articles from fluoroelastomeric copolymers consisting of VDF, perfluoroalkylvinylether (PAVE) and tetrafluoroethylene (TFE) monomeric units containing small amounts of bromine containing olefin, or bromoalkylvinylethers, vulcanizable by free radicals with peroxides and crosslinking agents.

Said copolymers possess good low temperature characteristics, but present several disadvantages (drawbacks), due to their poor processability, which renders them not suitable for use in the manufacture of "shaft seals".

In addition they can be vulcanized only by peroxides, with all the inconveniences associated with this vulcanization method, such as for instance the need of accurate temperatures controll in compounding operations and the short "scorch" time and thermal activation time.

Elastomeric copolymers consisting of VDF, HFP, PAVE and TFE monomeric units and containing VDF in an amount of at least 48% by weight, are described in French Patent Nos. 2,259,849 and 2,347,389. These copolymers however show unsatisfactory chemical resistance to motor oils and gasolines containing alcohols, and further possess poor mold processability, so that they are less suitable for use in the preparation of the manufactured articles mentioned above.

THE PRESENT INVENTION

It is the object of the present invention to provide fluoroelastomeric copolymers which are suitable for the manufacture of "shaft seals" and "fuel hoses", and therefore possess the combination of the above listed properties, while being at the same time vulcanizable by ionic methods with a good vulcanization rate.

Said copolymers, which form the object of the present invention, are characterized by comprising the following composition of monomeric units by weight:

| VDF | 30–47% |
|---|---|
| HFP (hexafluoropropene) | 18–40% |
| PAVE | 3–20% |
| TFE | 10–30% | the sum of HFP+PAVE being maximum 50%, and minimum 27%.

Among the copolymers which form the object of the present invention, particularly suitable for the preparation of articles intended for contact with motor oils, such as "shaft seals" and "valve steam seals", are those having the following composition of monomeric units by weight:

| VDF | 40–47% |
|---|---|
| HFP | 18–40% |
| PAVE | 3–12% |
| TFE | 15–25% | the sum of HFP+PAVE having the maximum and minimum values indicated above and the preferred PAVE contents being comprised between 3 and 9%, but even more preferably between 5 and 8%.

Copolymers having this composition combine a good chemical resistance with a high vulcanization rate, which is an essential requirement in processing technology, such as injection molding. Furthermore they exhibit optimum molding characteristics, in terms of releasability of molded articles from the vulcanization molds, and low temperature performance, which is reflected in the sealing properties of "shaft seals", which are more able to follow the eccentricity of the moving shaft when the temperature is lowered.

Among the copolymers of the present invention particularly suitable for preparing articles intended for contact with gasolines, such as "fuel hoses", are those having the following monomeric composition by weight:

| VDF | 30–40% |
|---|---|
| HFP | 18–40% |
| PAVE | 3–20% |
| TFE | 15–30% | the maximum and minimum values of HFP +PATE being the ones indicated above.

Due to the above indicated monomeric composition, said copolymers are capable of satisfying increasingly severe market specifications, which require good resistance to alcohols and gasolines containing alcohols, in particular methanol.

In particular, said copolymers possess low swelling values and reduced permeability to said alcohols and gasolines, good low temperature and bend test performance, as described in the Nissan Engineering Standards specification: "Fuel hoses for high pressures", 1985 NES D2922.

This specification prescribes a maximum swelling value of 10% in Fuel B (mixture of 70% by volume of isooctane and 30% by volume of toluene) at 40° C. for 72 hours and in terms of low temperature performance, as measured by the "bend test" (ASTM D2136-84) at −40° C.; and also prescribes no breakage or defect on the surface of the manufactured article.

Tests have shown that the copolymers which are preferred for shaft seals can be used also for preparing fuel hoses and satisfy the above indicated specifications.

Experiments have further shown that the above indicated maximum swelling value is not achieved with the copolymers of the invention, even when employing a methanol containing fuel, such as for example M20 (40% isooctane, 40% toluene and 20% methanol).

The copolymers of the present invention can be prepared by known methods, such as for example those described in Kirk Othmer, Encyclopedia of Chemical Technology, vol. 8, pages 500 and ff., 1979. In particular, polymerization in bulk, in organic solvent solutions and in emulsion or suspension in water can be used as polymerization methods.

Free radical polymerization initiators which can be used are for example inorganic peroxides, such as ammonium or potassium persulphates, redox systems, such as persulphate, disulphite and iron persulphate, organic peroxides such as benzoyl peroxide, dicumylperoxide, diisopropylperoxydicarbonate, diethylhexyl peroxydicarbonate, etc.

Preferably the preparation is carried out in an aqueous emulsion. Any type of emulsifying agent, perfluorinated or partially fluorinated, or mixtures thereof with hydrogenated emulsifiers, can be used in the process of the invention; an example of a suitable emulsifier is a fluorinated carboxylic acid.

Chain transfer agents which can be used are for example ethyl acetate and diethyl malonate; chain transfer agents containing iodine and/or bromine are also used, such as for instance compounds having the general formula $Rf(I)_x(Br)_y$ (Rf=perfluorinated hydrocarbon radical containing from 1 to 8 carbon atoms; x,y=integers comprised between 0 and 2, with at least x or y=1 and $x+y \leq 2$).

Alkaline or alkaline earth metal iodides and/or bromides can be used as well, as described in European Patent Application No. 407,937.

Polymerization temperatures are comprised between 25° C. and 150° C. and operating pressures between 8 and 80 atmospheres.

The perfluoroalkylvinylethers (PAVE) to be used in the preparation of the copolymers of this invention are those containing alkyl groups having 1-3 carbon atoms, such as perfluoromethylvinylether (PMVE), perfluoroethylvinylether (PEVE) or perfluoropropylvinylether (PPVE).

PMVE is preferred.

The preparation of the copolymers according to the invention can be advantageously carried out by polymerization in aqueous suspension in the presence of a microemulsion formed by one or more perfluorooxyalkylenes and water, as described in European Patent Application Nos. 247,379 and 250,767.

Vulcanization systems useful for the polymers of the invention are well known and consist of a crosslinking agent and a vulcanization accelerator.

Crosslinking agents are among those described in U.S. Pat. Nos. 4,259,463, 3,876,654, 4,233,421 and may include aromatic and aliphatic polyhydroxylic compounds.

Representative examples of the aromatic class are di-, tri- and tetrahydroxybenzene, -naphthalene, -anthracene and bisphenol derivatives. Preferred are aromatic compounds which include 4,4',thiodiphenol isopropylene-bis (4-hydroxybenzene) (i.e. Bisphenol A) and hexafluoroisopropylene.bis (4-hydroxybenzene) (i.e. Bisphenol AF), which are described in U.S. Pat. No. 4,233,421.

Compounds which can be used as vulcanization accelerators are known and are described in several U.S. Patents, such as, for instance, U.S. Pat. Nos. 3,655,727, 3,712,877, 3,857,807, 3,686,143, 3,933,732, 3,876,654, 4,233,421, 4,259,463, and in European Patent Applications such as, for instance, European Patent Application Nos. 0,182,299, 0,120,462. Preferred are the classes of phosphonium and aminophosphonium quaternary salts as described in U.S. Pat. Nos. 3,876,654 and 4,259,463.

The following examples serve to illustrate the object of the present invention without being limited thereof.

The values of releasability of the plaques from the aluminum foil are defined with by A when the release is good, and with by B when it is mediocre.

EXAMPLE 1

A 5 l reactor equipped with a stirrer operating at 630 r.p.m. was used.

3,500 g of water are charged to the reactor under vacuum and the reactor is then brought to pressure by feeding a monomeric mixture having the following molar composition:

| | |
|---|---|
| VDF | 53.5% |
| HFP | 30.0% |
| PMVE | 7.0% |
| TFE | 9.5% |

The operating temperature is 85° C. and the pressure 19 relative bar.

Thereafter are added, in sequence:

4.2 g ammonium persulphate (PSA), dissolved in water.
6.4 g ethyl acetate as chain transfer agent, 3.2 g of which at 5% monomer conversion and the remainder subdivided into 4 additions of 0.8 g each, executed at 24%, 43%, 62% and 81% conversion, respectively.

The pressure is maintained constant during the polymerization by feeding the monomers at the following molar ratios:

| | |
|---|---|
| VDF | 70.5% |
| HFP | 13.5% |
| PMVE | 4.0% |
| TFE | 12.0% |

After 46 minutes, 1,580 g of the polymer are obtained. The reactor is cooled, the emulsion discharged and coagulated by adding an aqueous solution of aluminum sulphate.

The polymer is isolated, washed in water and dried in a circulating air oven at 60° C. for 24 hours.

Table 1 reports the data concerning the polymer composition, the value of the glass transition temperature $T_g$ and of the Mooney viscosity.

Table 2 reports data concerning the formulation used for vulcanizing the polymer, the characteristics of such formulation, as well as the characteristics of the vulcanized polymer, after post-vulcanization in oven at 230° C. for 24 hours. The vulcanization of the polymer was carried out in press at 170° C. for 10 minutes.

EXAMPLE 2 (comparative)

Operating conditions are as in Example 1, but in this case the reactor pressure is achieved through a monomeric mixture having the following molar composition:

| | |
|---|---|
| VDF | 35% |
| HFP | 53% |
| TFE | 12% |

Pressure is maintained constant during polymerization by feeding a monomeric mixture of the following molar composition:

| VDF | 61% |
|---|---|
| HFP | 20% |
| TFE | 19% |

After 53 minutes of polymerization, 1,550 g of the polymer are obtained.

Tables 1 and 2 report the data concerning the characteristics of the obtained polymer, the vulcanizing formulation and the vulcanized product.

EXAMPLE 3

Operating conditions are as in Example 1, with the exception that in this case the reactor pressure is attained through a monomeric mixture having the following molar composition:

| VDF | 43% |
|---|---|
| HFP | 34% |
| PMVE | 14% |
| TFE | 9% |

The pressure is maintained constant during polymerization by feeding a monomer mixture having the following molar composition:

| VDF | 60% |
|---|---|
| HFP | 15% |
| PMVE | 7% |
| TFE | 18% |

After 47 minutes of polymerization, 1,514 g of the polymer are obtained.

Tables 3 and 4 report the data concerning the characteristics of the obtained polymer, the vulcanizing formulation and the vulcanized product.

EXAMPLE 4 (comparative)

Operating conditions are as in Example 1, with the exception that in this case the pressure in the reactor as attained using a monomer mixture having the following molar composition:

| VDF | 23.5% |
|---|---|
| HFP | 65.0% |
| TFE | 11.5% |

Pressure is maintained constant during polymerization by feeding a monomeric mixture of the following molar composition:

| VDF | 50% |
|---|---|
| HFP | 26% |
| TFE | 24% |

After 74 minutes of polymerization, 1,585 g of the polymer are obtained.

Tables 3 and 4 report the data concerning the characteristics of the obtained polymer, the vulcanizing formulation and the vulcanized product.

TABLE 1

| | Example 1 | Example 2 |
|---|---|---|
| Polymer Composition (% weight) | | |
| VDF | 47.3 | 45.8 |
| HFP | 24.5 | 33.8 |
| PMVE | 7.1 | 0.0 |
| TFE | 21.1 | 20.4 |
| Mooney Viscosity (ML (1 + 10) 121° C.) | 57 | 59 |
| $T_g$ (DSC) (° C.) | −29.1 | −19.3 |

TABLE 2

| | Example 1 | Example 2 |
|---|---|---|
| Composition of Vulcanizing Formulation: | | |
| Polymer | 100 | 100 |
| M1 | 4 | 4 |
| M2 | 1.5 | 1.5 |
| MgO DE | 3 | 3 |
| Ca(OH)$_2$ | 6 | 6 |
| MT Black | 30 | 30 |
| Formulation Characteristics: ODR 177° C. ARC ±3 (ASTM D 2084-81) | | |
| ML (pounds × inch) | 14 | 15 |
| MH (pounds × inch) | 103 | 82 |
| $T_{s2}$ (s) | 174 | 183 |
| $T'_{90}$ (s) | 297 | 372 |
| Crosslinking Yield (MH - ML) | 89 | 67 |
| Characteristics of the Product (Vulcanized in Press at 170° C. for 10 min and Post-Vulcanized at 230° C. for 24 hrs) (ASTM D412-83) | | |
| M 100 (MPa) | 5.8 | 4.5 |
| C.R. (MPa) | 15.5 | 15.6 |
| A.R. (%) | 207 | 217 |
| Shore A (ASTM D 2240-81) | 73 | 73 |
| TR Test (ASTM D1329) | | |
| TR 10% (° C.) | −20.4 | −12.6 |
| TR 30% (° C.) | −17.1 | −9.4 |
| TR 50% (° C.) | −14.6 | −7.3 |
| Chemical Stability Test (in ASTM 3 Oil at 150° C. for 24 hrs) | | |
| Variation M 100 (%) | −10 | −7 |
| Variation C.R. (%) | −15 | −14 |
| Variation A.R. (%) | 4 | 0 |
| Volume Variation (%) | 1.6 | 1.9 |
| Plaque Release from Aluminum Foil | | |
| (after treatment in press at 170° C. for 10 min) | A | A |

M1: Master 50% elastomer/50% Bisphenol AF
M2: Master 70% elastomer/30% Diphenylbenzyl,N-diethylphosphonium chloride

TABLE 3

| | Example 3 | Example 4 |
|---|---|---|
| Polymer Composition (% weight) | | |
| VDF | 37.6 | 37.3 |
| HFP | 23.6 | 38.1 |
| PMVE | 13.3 | 0.0 |
| TFE | 25.5 | 24.6 |
| Mooney Viscosity (ML (1 + 10) 121° C.) | 53 | 48 |
| $T_g$ (DSC) (° C.) | −22.2 | −10.5 |

TABLE 4

| | Example 3 | Example 4 |
|---|---|---|
| Composition of Vulcanizing Formulation: | | |
| Polymer | 100 | 100 |
| M1 | 4.5 | 4.5 |
| M2 | 3 | 3 |

TABLE 4-continued

|  | Example 3 | Example 4 |
|---|---|---|
| MgO Y | 7 | 7 |
| Ca(OH)$_2$ | 3 | 3 |
| MT Black | 20 | 20 |
| Carnauba Wax | 1 | 1 |
| Formulation Characteristics: | | |
| ODR 177° C. ARC ±3 (ASTM D 2084-81) | | |
| ML (pounds × inch) | 9 | 10 |
| MH (pounds × inch) | 74 | 61 |
| T$_{s2}$ (s) | 183 | 225 |
| T'$_{90}$ (s) | 354 | 414 |
| Crosslinking Yield (MH - ML) | 65 | 51 |
| Characteristics of the Product | | |
| (Vulcanized in Press at 170° C. for 10 min | | |
| and Post-Vulcanized at 230° C. for 24 hrs) | | |
| (ASTM D412-83) | | |
| M 100 (MPa) | 3.7 | 3.9 |
| C.R. (MPa) | 14 | 14 |
| A.R. (%) | 241 | 317 |
| Shore A (ASTM D 2240-81) | 68 | 73 |
| TR Test (ASTM D1329) | | |
| TR 10% (° C.) | −18 | −7 |
| TR 30% (° C.) | −14 | −3.8 |
| TR 50% (° C.) | −8.7 | −1 |
| Swelling in Fuel B at 40° C. for 72 hrs (%) | 6 | 4 |
| Swelling in M20 at 40° C. for 72 hrs (%) | 9 | 10 |
| Bend Test | | |
| (at −40° C. after vulcanization in press) | no defect | defects |

M1: Master 50% elastomer/50% Bisphenol AF
M2: Master 70% elastomer/30% Diphenylbenzyl,N-diethylphosphonium chloride

We claim:

1. An ionically vulcanizable fluoroelastomeric copolymer suitable for use in the manufacture of shaft seals and fuel hoses consisting essentially of the following non-brominated monomeric units:
   (a) 30–47% by weight of vinylidene fluoride (VDF);
   (b) 18–40% by weight of hexafluoropropene (HFP);
   (c) 3–20% by weight of a perfluoroalkylvinylether (PAVE);
   and
   (d) 10–30% by weight of tetrafluoroethylene (TFE);
wherein the sum of the HFP and PAVE contents is between 27 and 50% by weight.

2. The fluoroelastomeric copolymer of claim 1, wherein the percentages by weight of components a), b), c) and d) are:
   a) 30–40%;
   b) 18–40%;
   c) 3–20%;
   d) 15–30%.

3. The fluoroelastomeric copolymer of claim 1, wherein the percentages by weight of components a), b), c) and d) are:
   a) 40–47%;
   b) 18–40%;
   c) 3–12%;
   d) 15–24%.

4. The fluoroelastomeric copolymer of claim 3 wherein the percentage by weight of component c) is between 3 and 9%.

5. The fluoroelastomeric copolymer of claim 3 wherein the percentage by weight of component c) is between 5 and 8%.

6. The fluoroelastomeric copolymer of claim 1, in which component (c) is selected from the group consisting of perfluoromethylvinylether, perfluoroethylvinylether and perfluoropropylvinylether.

* * * * *